(12) United States Patent
Lee

(10) Patent No.: US 8,139,771 B1
(45) Date of Patent: Mar. 20, 2012

(54) SYSTEM AND METHOD FOR SWITCHING A MODE OF A RECEIVER USING BLOCK ESTIMATION

(75) Inventor: Chris Cheng-Chieh Lee, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 1194 days.

(21) Appl. No.: 11/871,751

(22) Filed: Oct. 12, 2007

Related U.S. Application Data

(60) Provisional application No. 60/829,202, filed on Oct. 12, 2006.

(51) Int. Cl.
*H04H 40/81* (2008.01)
*H04H 40/54* (2008.01)
*H04H 40/72* (2008.01)

(52) U.S. Cl. ................ 381/11; 381/12; 381/13

(58) Field of Classification Search .......... 381/11, 381/12, 13, 10; 455/283, 296
See application file for complete search history.

(56) References Cited

U.S. PATENT DOCUMENTS

| 4,703,501 A * | 10/1987 | Sugai et al. .......... 381/10 |
| 2007/0223707 A1 * | 9/2007 | Chen .................. 381/12 |

* cited by examiner

*Primary Examiner* — Vivian Chin
*Assistant Examiner* — Douglas Suthers

(57) ABSTRACT

A system and method for switching a mode of a receiver between a monophonic and stereophonic mode is disclosed. The method can include generating a residual signal indicative of a noise level associated with a pilot energy signal, calculating a residual block energy level of the residual signal over an observation interval, generating a monitor signal based on a number of times the pilot energy signal is less than a pilot energy threshold during the observation interval and switching the mode of the receiver based on the residual block energy level and the monitor signal.

23 Claims, 12 Drawing Sheets

SYSTEM AND METHOD FOR SWITCHING A MODE OF A RECEIVER USING BLOCK ESTIMATION

INCORPORATION BY REFERENCE

This application claims the benefit of U.S. Provisional Application No. 60/829,202, "Method and Algorithm to Estimate the Channel Condition Based on Filtered Pilot Energy Signal" filed on Oct. 12, 2006, incorporated herein by reference in its entirety.

BACKGROUND

Receivers that detect stereophonic/monophonic signals are incorporated into a vast number of devices used in everyday life. For example, such receivers are used in automobile radios, a variety of communication systems such as cellular telephones, and even in children's toys. Unfortunately, many modern receiver systems suffer from performance shortfalls, such as frequent switchover between monophonic and stereophonic modes due to noisy channel environments and false detection of stereophonic signals as monophonic due to rated maximum system deviation (RMSD) mismatch.

In order to receive FM audio signals, be they music or any other type of information, a receiver must be robust enough to handle changes in the channel wherein the transmission could become very noisy and/or must overcome interference. Generally, a pilot tone is transmitted as part of the baseband signal that is used to modulate an FM carrier signal in order to indicate the nature of the transmission to be stereophonic. The energy of the pilot tone may fluctuate significantly in a harsh channel scenario. Simply comparing the pilot tone energy, estimated at the receiver, against a predetermined threshold may cause the receiver to switch between monophonic and stereophonic mode too frequently and degrade the entertainment quality of the audio program delivered to the consumer.

In addition, the receiver structure and the accompanying algorithms must also be flexible enough to handle a situation where the transmitted FM signal RMSD is not known beforehand. Generally, the allowed RMSD values are 75 kHz and 50 kHz. Hence, a mono/stereo transmission may be utilizing either one of them. However, the receiver may be set to operate at a different RMSD than the received signal RMSD. If the received signal RMSD and the RMSD of the receiver are not matched, a situation may occur wherein a stereophonic signal may be falsely interpreted as monophonic by the receiver. This results in the listener being denied the stereophonic quality of the program that the service provider is transmitting on the airwaves.

SUMMARY

The present disclosure relates to a system and method for estimating a channel condition based on filtered pilot energy and the noise energy associated with the pilot, and more particularly, a system and method capable of improving the stereophonic/monophonic detection of broadcast audio signals.

An embodiment can provide a method for switching a mode of a receiver. The method can include generating a residual signal indicative of the residual signal over an observation interval, calculating a residual block energy level of the residual signal over an observation interval, generating a monitor signal based on a number of times the pilot energy signal is less than a pilot energy threshold during the observation interval, and switching the mode of the receiver based on the residual block energy level and the monitor signal. The residual block energy level for the residual block energy signal over the observation interval can be computed by at least one of L1 norm and L2 norm. The monitor signal can be generated by incrementing a counter every time the pilot energy signal is less than the pilot energy threshold during the observation interval.

Additionally, the method can include designating a portion of the residual signal within the observation interval as either a mono block or a stereo block based on the residual block energy level and the monitor signal. In a specific embodiment, the portion can be designated as a mono block when the residual block energy level over the observation interval is greater than a residual block energy threshold, and/or the monitor signal is less than a mode switch threshold. Otherwise, the portion can be designated as a stereo block.

The method can further include switching the mode of the receiver from a monophonic mode to a stereophonic mode if a predetermined number of consecutive portions of the residual signal are designated as stereo blocks. Additionally the method can include switching the mode of the receiver from a stereophonic mode to a monophonic mode if a predetermined number of consecutive portions of the residual signal are designated as mono blocks.

Additionally, the exemplary method can include filtering the pilot energy signal to generate a filtered pilot energy signal. Filtering can be accomplished by a filter having the response transfer function H(z):

$$H(z) = \frac{\rho}{1-(1-\rho)z^{-1}}$$

where $\rho$ is a leakage factor and $z$ is a delay factor. Further, the leakage factor can be varied between a first value and a second value to minimize a noise level of the filtered pilot energy signal and to reduce a response time of the receiver.

An audio receiver is disclosed that includes a mono/stereo detector that causes the audio receiver to output either a monophonic or a stereophonic signal based on two statistical estimates: pilot energy estimate computed by filtering pilot energy signal and an estimate of the residual signal that is the difference between the pilot energy signal and the pilot energy estimate wherein the latter is an index of the composite effect of channel noise and interference. The filtering process is utilized to get a more accurate estimate of the pilot energy which is smoothed out, and hence has a smaller variance than when not filtered. The audio receiver can include a low pass filter, such as a 1-tap IIR filter, that filters (smoothes) the pilot energy signal to generate a filtered pilot energy signal with an appropriately set filter leakage factor.

In order that the residual signal is a meaningful representative of the channel condition, a certain time duration also referred to as an observation interval, herein called a block is chosen over which the noise and interference are averaged out. The duration of a block can be defined as an integer N such that N>0, that consists of a time duration of N*Sampling interval. The successive blocks can be contiguous but non-overlapping in time. The decision about the monophonic and the stereophonic transmission is based on two issues; the channel condition estimation and the pilot energy estimation. The channel condition can be estimated, over the observation interval, by the mean noise energy estimated by averaging the residual samples over the observation interval. The process of channel condition estimation as well as the pilot energy estimation can be done by two different comparison processes.

BRIEF DESCRIPTION OF THE DRAWINGS

Embodiments of the receiver incorporating a mono/stereo detector (MSD) will be described with reference to the following drawings, wherein like numerals designate like elements, and wherein.

DETAILED DESCRIPTION OF EMBODIMENTS

Figure 1:
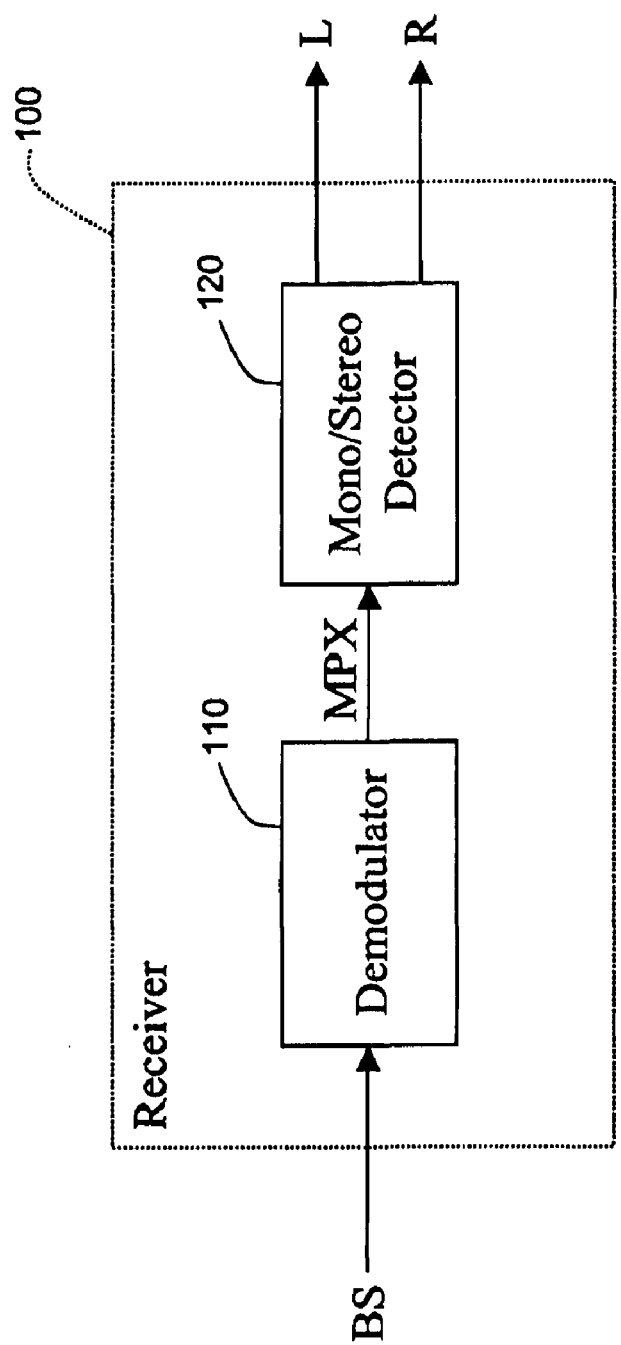
FIG. 1 shows a block diagram of an exemplary receiver incorporating an MSD.

FIG. 1 shows a receiver 100 having a mono/stereo detector (MSD) 120 that is capable of robust and flexible detection of stereophonic signals. As shown in FIG. 1, mono/stereo detector 120 is coupled to a demodulator 110, which receives a frequency modulated (FM) carrier signal BS from an antenna (not shown). Demodulator 110 demodulates BS into a multiplex signal MPX and then feeds MPX to a mono/stereo detector 120. Mono/stereo detector 120 processes MPX and outputs a left signal L and a right signal R, which may then be amplified by an amplifier (not shown) and used to drive a left and a right speaker (not shown), respectively.

Depending on the presence and the state of a pilot tone component in the multiplex signal MPX, the mono/stereo detector 120 may output either left and right signals L and R in a stereophonic form or a monophonic form.

Figure 2:
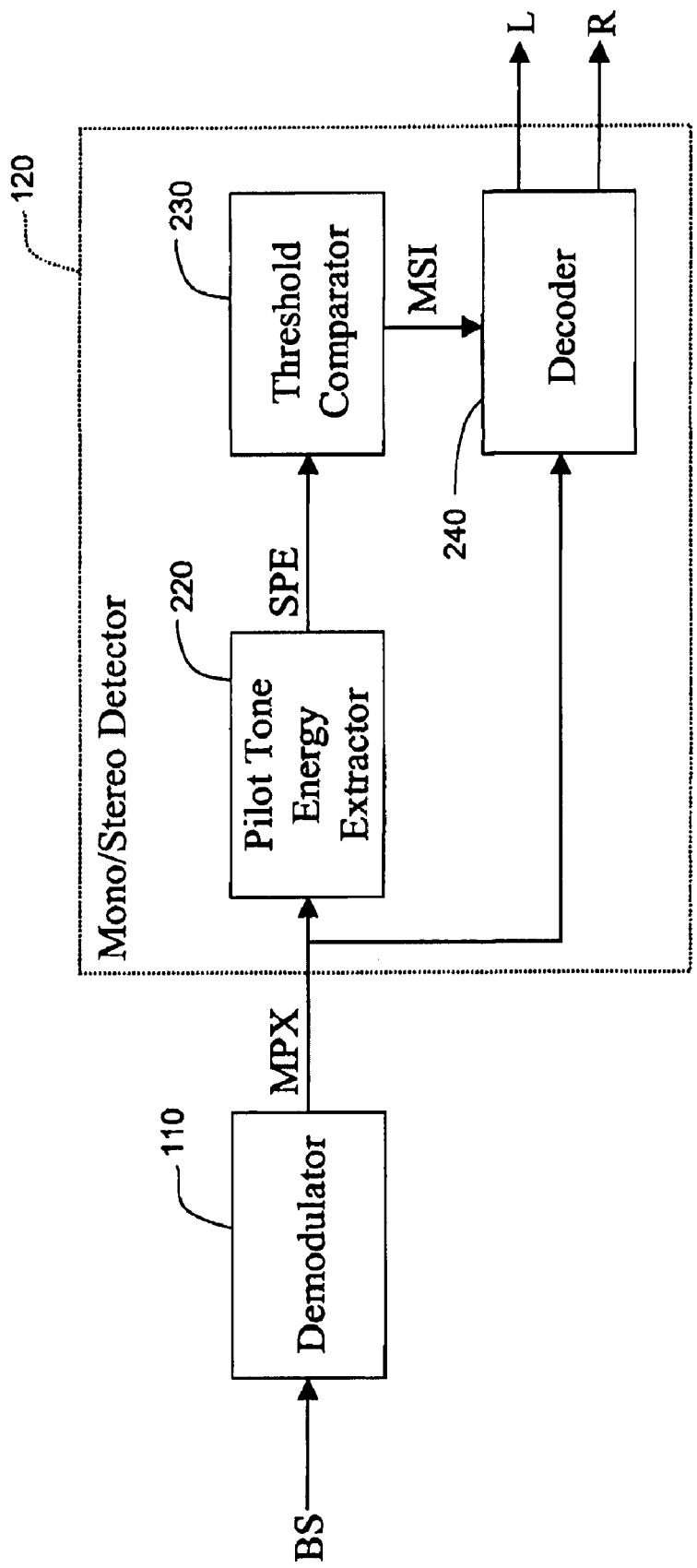
FIG. 2 shows a block diagram of an exemplary MSD shown in FIG. 1.

FIG. 2 shows a block diagram of a portion of the receiver 100 with the mono/stereo detector 120 shown in greater detail. The mono/stereo detector 120 may include a pilot tone energy extractor 220, a threshold comparator 230, and a decoder 240, each of which are described in greater detail below.

The pilot tone energy extractor 220 extracts and processes the pilot tone signal and generates from it pilot energy signal samples SPE, which can be a measure of pilot energy per audio sample. Subsequently, pilot energy signal samples are fed to threshold comparator 230, which compares SPE and the variants of it to several pre-set parameters (e.g., energy and noise thresholds) and outputs a mono/stereo indicator signal MSI that controls the output of decoder 240.

The decoder 240 utilizes various filters and algorithms to extract left and right signals L and R from multiplex signal MPX as desired output by the receiver 100. However, whether left and right signals L and R are stereophonic or monophonic will depend on the control signal MSI signal that the decoder 240 receives from threshold comparator 230.

The threshold comparator 230 receives the pilot energy signal samples SPE from the pilot tone energy extractor 220 and compares each sample to a predetermined threshold. If the SPE value exceeds the threshold, it implies that the pilot tone has sufficient energy to declare that pilot tone is actually present. Accordingly, the mono/stereo indicator signal MSI signifies the nature of the transmission to be stereophonic. However, if the channel is too noisy and/or there is excessive interference, the receiver may go through the mode change from stereophonic to monophonic, and vice versa, too frequently and hence degrade the quality of the reception.

A more robust approach is proposed, wherein the decision on the operating mode of the receiver is based not only on the received pilot energy, but on the channel condition as well. Hence, a two step procedure can be followed. The first step involves estimating the energy of noise and interference and comparing it to a predefined threshold value. The second step involves estimating the pilot energy more accurately before it is compared to a threshold value. The reliability of both the aforementioned estimations, that of the noise energy as well as the pilot energy, can be substantially improved by doing these estimations over a predetermined time duration, referred to as an observation interval. Based on the results of the above-described procedure, the threshold comparator 230 outputs an appropriate MSI signal to the decoder 240.

For example, if the MSI signal indicates that the energy of the detected pilot tone signal is sufficient and the channel condition indicates that the noise is less than a predetermined threshold, the decoder 240 will output left and right signals L and R in stereophonic form. Whereas, if the MSI signal indicates that the energy of the detected pilot tone signal is either insufficient or the channel condition is too noisy as compared to the predetermined noise threshold, decoder 240 will output left and right signals L and R in monophonic form. Hence, a robust, reliable and flexible detection of stereophonic signals can be achieved.

Figure 3:
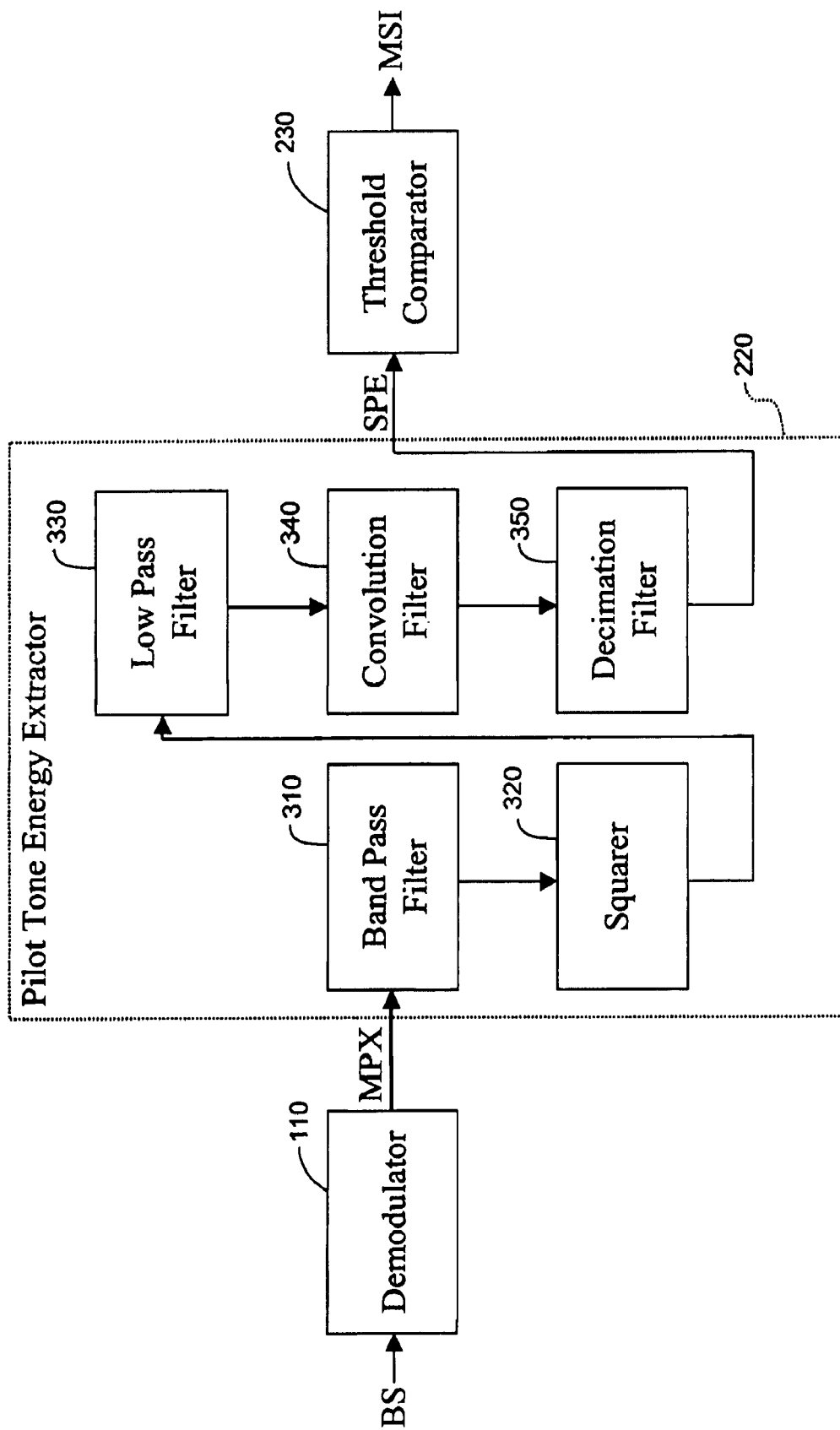
FIG. 3 shows a block diagram of an exemplary pilot tone energy extractor of FIG. 2.

FIG. 3 shows a block diagram of an exemplary pilot tone energy extractor 220 of FIG. 2. Pilot tone energy extractor 220 may include a band pass filter 310, a signal squarer 320, that multiplies the signal to itself, a low pass filter 330, a convolution filter 340, and a decimation filter 350.

The band pass filter 310 defines a predetermined shape of the frequency response over a band of frequency, such that its output is the appropriately shaped version of the MPX input. For example, in one embodiment, band pass filter 310 may be a notch filter tuned to the 19 kHz pilot tone signal. The signal extracted from the squarer 320 mainly includes a DC component representing the pilot signal power and a second harmonic tone of 38 kHz along with residue of the channel noise and interference. Next, the low pass filter 330 outputs the DC component along with the low pass filter shaped noise component. The convolution filter 340 accumulates (or averages the signal over a predetermined and programmable time interval governed by $N_o$ samples, where $N_o$ is an integer>0).

The decimation filter 350 selects every $N_o^{th}$ sample. As a combined processing entity, the convolution filter 340 along with the decimation filter 350, make up a window accumulator wherein the window defines a time duration such that the successive windows can be contiguous and non-overlapping time intervals. The output of the decimation filter 350 are the pilot energy samples averaged over the window time duration of $N_o$ samples.

The signal samples output by decimation filter 350 are the sample pilot energy signal SPE which subsequently is fed to threshold comparator 230, where it is further processed and converted into mono/stereo indicator signal MSI for transmission to decoder 240.

Figure 4:
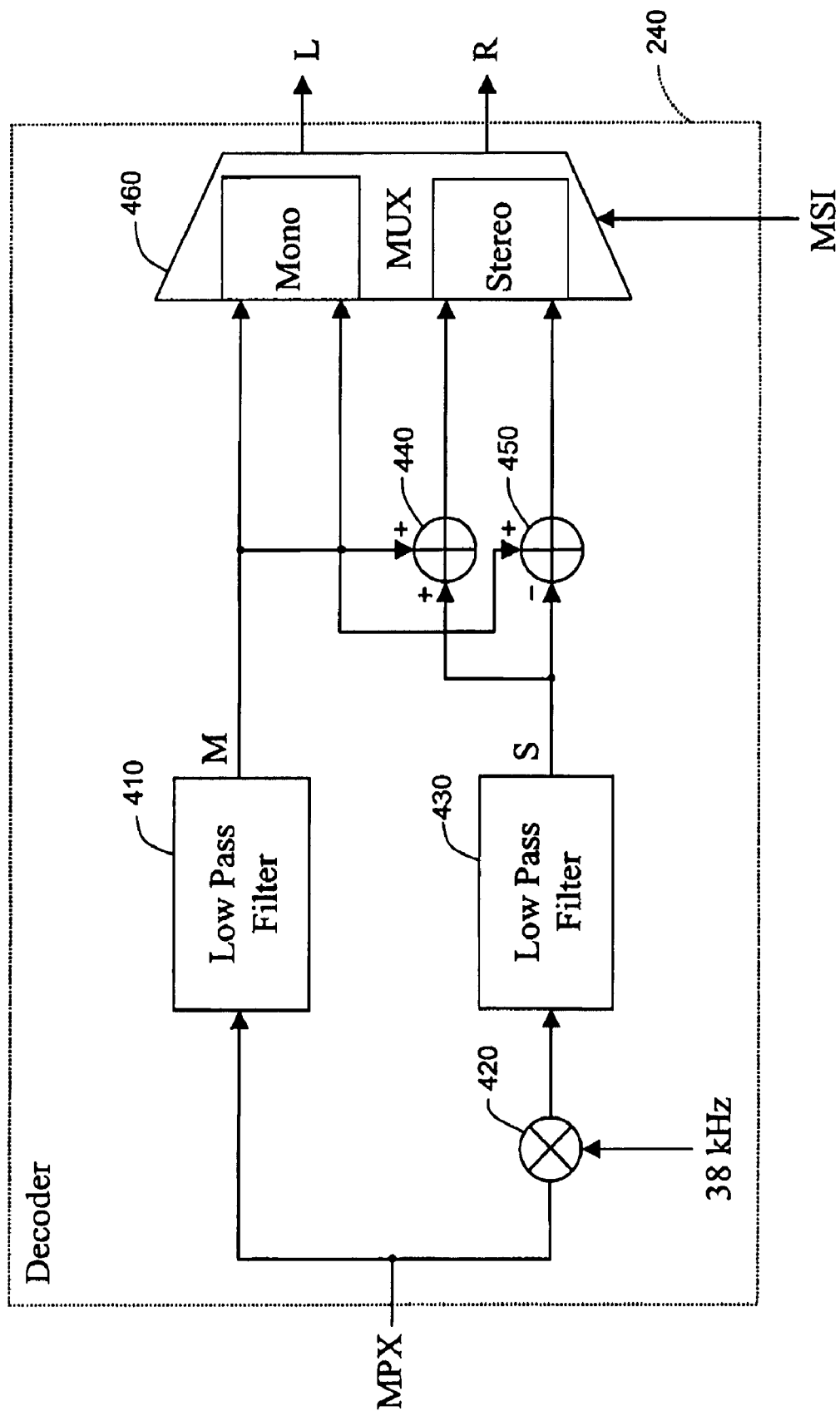
FIG. 4 shows a block diagram of an exemplary decoder that can be a part of an MSD of FIG. 2.

FIG. 4 shows decoder 240 that decodes multiplex signal MPX into left and right signals L and R. Decoder 240 may include two low pass filters 410 and 430, a signal multiplier 420, a signal adder 440, a signal subtractor 450, and a multiplexer (MUX) 460.

The multiplex signal MPX is processed along two signal paths. The first path is through the low pass filter 410 that isolates a sum signal M, which contains half of the sum of left and right signals L and R. The second signal path includes the signal multiplier 420 that mixes the multiplex signal MPX by a 38 kHz auxiliary carrier (obtained, for example, from the 19 kHz pilot tone), and a low pass filter 430. The signal multiplier 420 along with low pass filter 430 demodulate the component of the MPX signal to extract the difference signal S, which contains half of the difference between the left and right signals L and R. Subsequently, M and S signals are summed and subtracted by signal adder 440 and signal subtractor 450, respectively, and transmitted to a stereo input section (Stereo) of multiplexer 460. Furthermore, the signal M is transmitted to a mono input section (Mono) of multiplexer 460. Multiplexer 460 also receives mono/stereo indicator signal MSI, based on which it selects either the stereo signals or the mono signals for output on the L and R channels.

Figure 5:
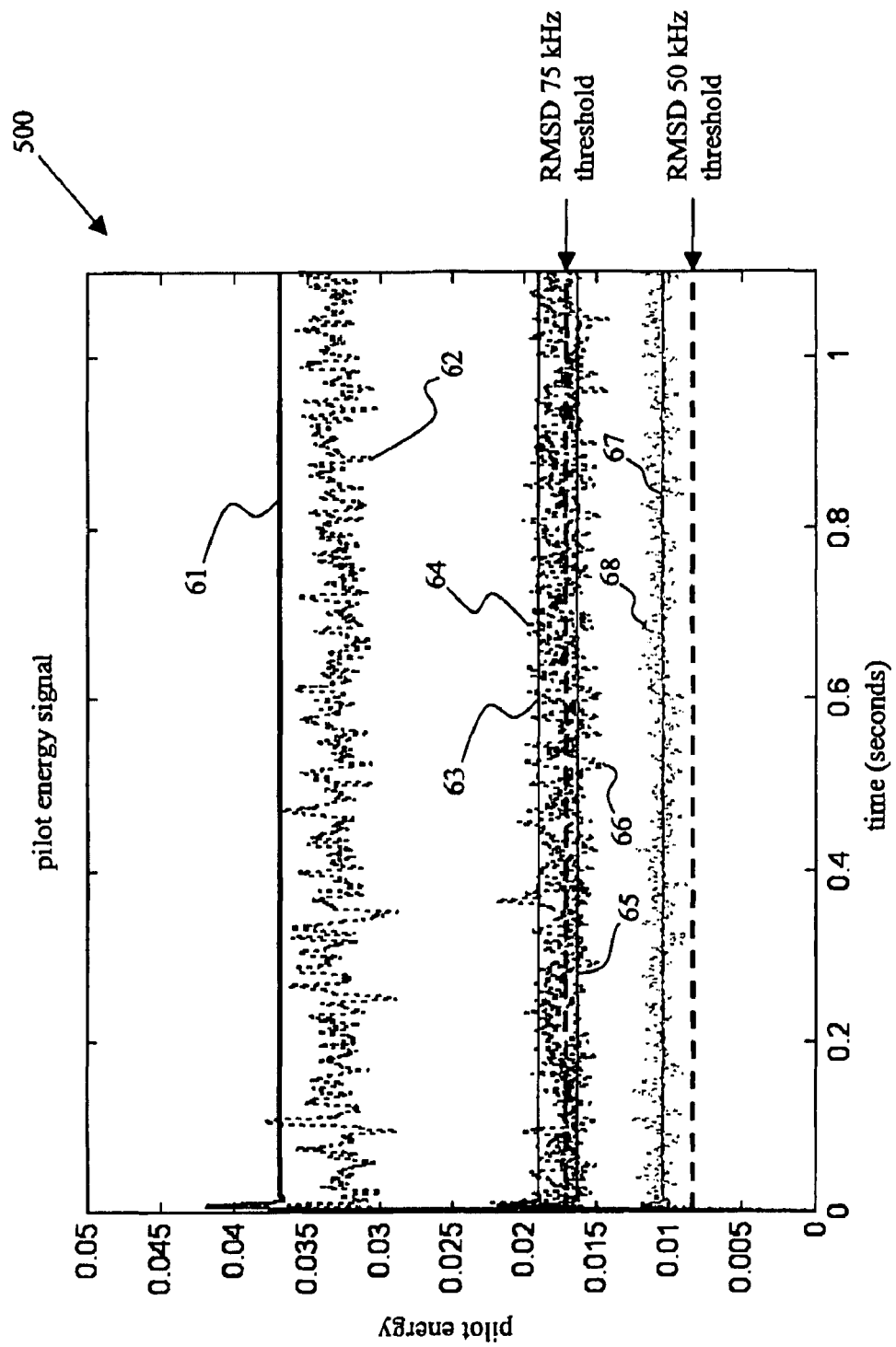
FIG. 5 shows a plot of a monitored unfiltered pilot energy signal for noiseless and noisy channel scenario of RMSD of 75 KHz and 50 KHz respectively.
Figure 6:
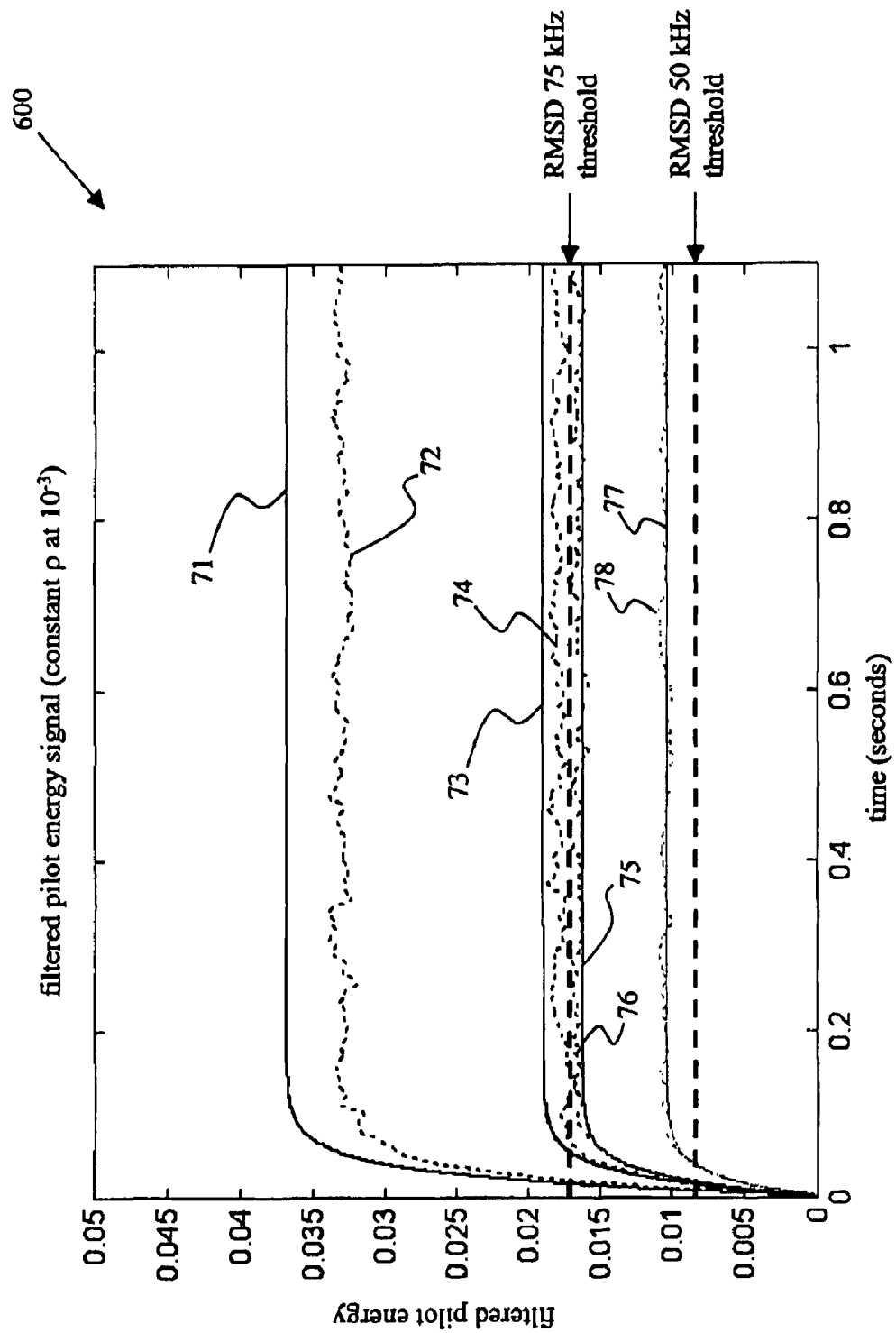
FIG. 6 shows a plot of a monitored filtered pilot energy signal using a constant leakage factor $\rho$ for the same scenarios as that for FIG. 5.

FIGS. 5 and 6 show diagrams 500 and 600, respectively, that illustrate results of simulations for unfiltered and filtered pilot energy signals in both clean and noisy channel environments.

FIG. 5 shows a diagram 500 that illustrates results of a simulation for an unfiltered pilot energy signal similar to signal SPE described in FIG. 3. This simulation illustrates how various pilot energy signals fluctuate without being smoothed by any filter processing.

The simulations were performed for the following signals: RMSD of 75 kHz with a clean pilot energy signal 61 at 10% of full scale; RMSD of 75 kHz with a noisy pilot energy signal 62 at 10% of full scale; RMSD of 75 kHz with a clean pilot energy signal 63 at 7.2% of full scale; RMSD of 75 kHz with a noisy pilot energy signal 64 at 7.2% of full scale; RMSD of 50 kHz with a clean pilot energy signal 65 at 10% of full scale; RMSD of 50 kHz with a noisy pilot energy signal 66 at 10% of full scale; RMSD of 50 kHz with a clean pilot energy signal 67 at 8% of full scale; and RMSD of 50 kHz with a noisy pilot energy signal 68 at 8% of full scale. RMSD 50 kHz and 75 kHz signal thresholds are delineated by the labeled thick dashed lines.

As shown in FIG. 5, unfiltered clean pilot energy signals 61, 63, 65, and 67 are flat and do not fluctuate. However, the unfiltered noisy pilot energy signals 62, 64, 66, and 68 can fluctuate wildly. Nonetheless, a response time for all of these signals is almost zero. That is, after the receiver is reset or a new radio station is selected (time=0 seconds), the pilot signals spike to their respective energy levels almost instantaneously. Without a low pass filter, such response times are possible, but with a significant throughput of noise, which can cause the receiver to switch from monophonic to stereophonic mode and vice versa too frequently when comparing the pilot tone energy against a predetermined threshold.

FIG. 6 shows a diagram 600 that illustrates results of a simulation for a filtered pilot energy signal similar to smooth pilot energy signal SPE described in FIG. 3. This simulation illustrates the performance of various pilot energy signals after being smoothed by a low pass filter with a constant leakage factor ρ. Although a low pass filter with a constant leakage factor ρ is used in the simulations, it should be appreciated that any filter with any transfer function that is appropriate for the purpose described herein may be used to filter the pilot energy signal. Further, it should be understood that characteristics of such filter, such as the leakage factor ρ, can be varied over time to achieve a more desirable filtered pilot energy signal.

The simulations were performed for the same clean and noisy pilot energy signals as that of FIG. 5, but only after being filtered by a low pass filter with a leakage factor ρ of $10^{-3}$. These pilot energy signals are indicated by reference numerals 71-78.

As shown in FIG. 6, filtered clean pilot energy signals 71, 73, 75, and 77 remain flat, and filtered noisy pilot energy signals 72, 74, 76, and 78 are much less noisy compared to the unfiltered pilot energy signals 62, 64, 66, and 68. However, filtering the pilot energy signals using a low pass filter with a leakage factor ρ introduces a significant response time lag. The pilot energy signals ramp up to their respective energy levels only after approximately 0.1 seconds. This time lag can be alleviated by utilizing a low pass filter with a varying leakage factor ρ.

Figure 7:
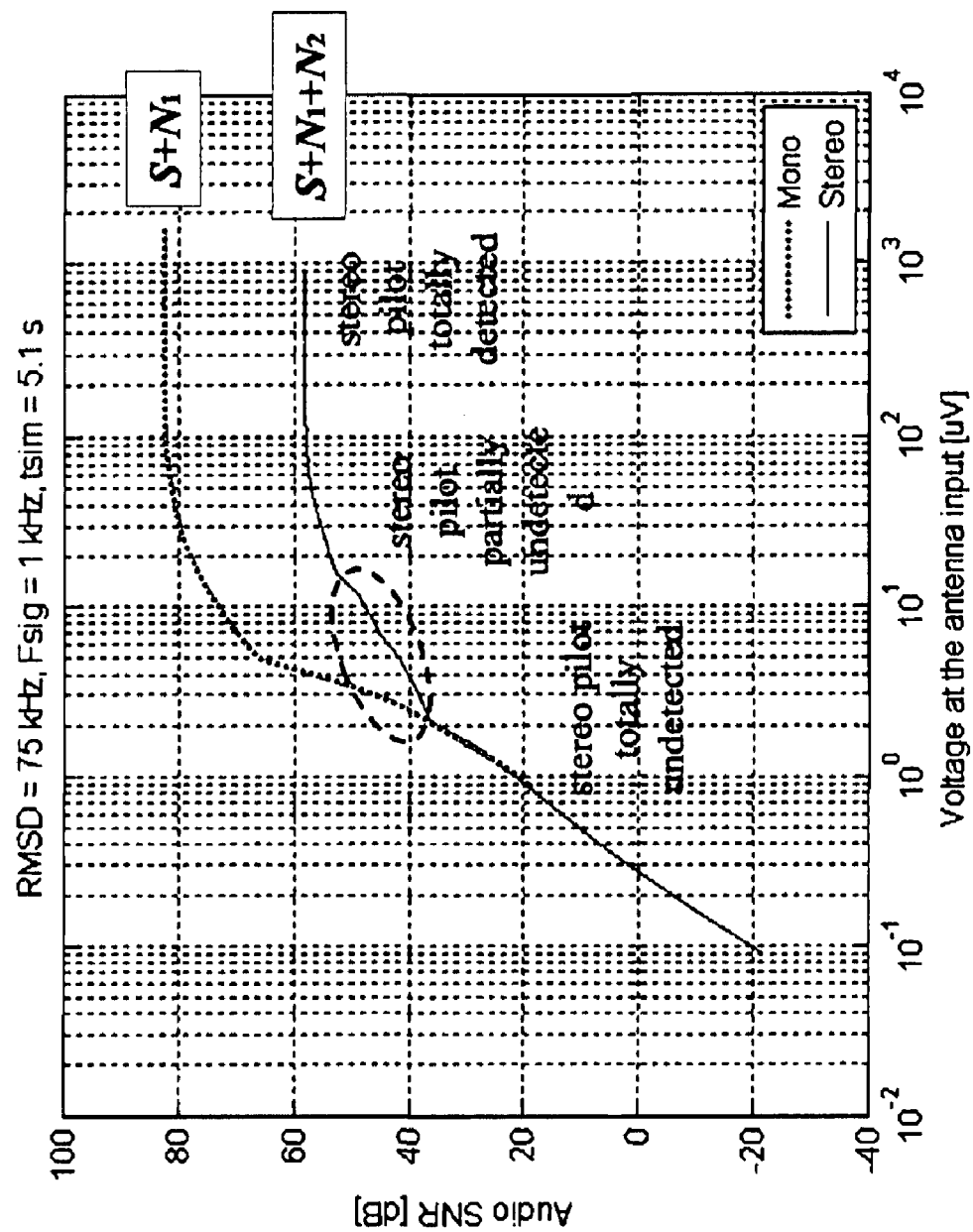
FIG. 7 shows a plot of a signal voltage received at the antenna against audio SNR.

FIG. 7 shows an exemplary plot of the signal voltage received at the antenna against the audio SNR. The simulation has been done at RMSD of 75 kHz and the modulating audio signal being a tone of 1 kHz. At the ranges of poor reception, for example, when the received signal is less than 2 µV the channel condition is so bad, e.g. signal to noise ratio SNR is so poor, that the pilot tone signifying the stereophonic transmission can remain undetected. This implies that, in the absence of a detected pilot tone, the receiver will operate only in a monophonic mode. In contrast, when the received signal strength is beyond 11 it can be seen that the pilot tone detection has increased substantially such that now the stereophonic mode is easily distinguishable from the monophonic mode. Hence, there can be higher probability that the correct mode of operation may be established at the receiver. In the example shown in FIG. 7, it can be seen that the range of the received signal at the antenna input between 2 µV and 11 µV is a grey area in that the receiver may not be able to detect a correct mode.

Figure 8:
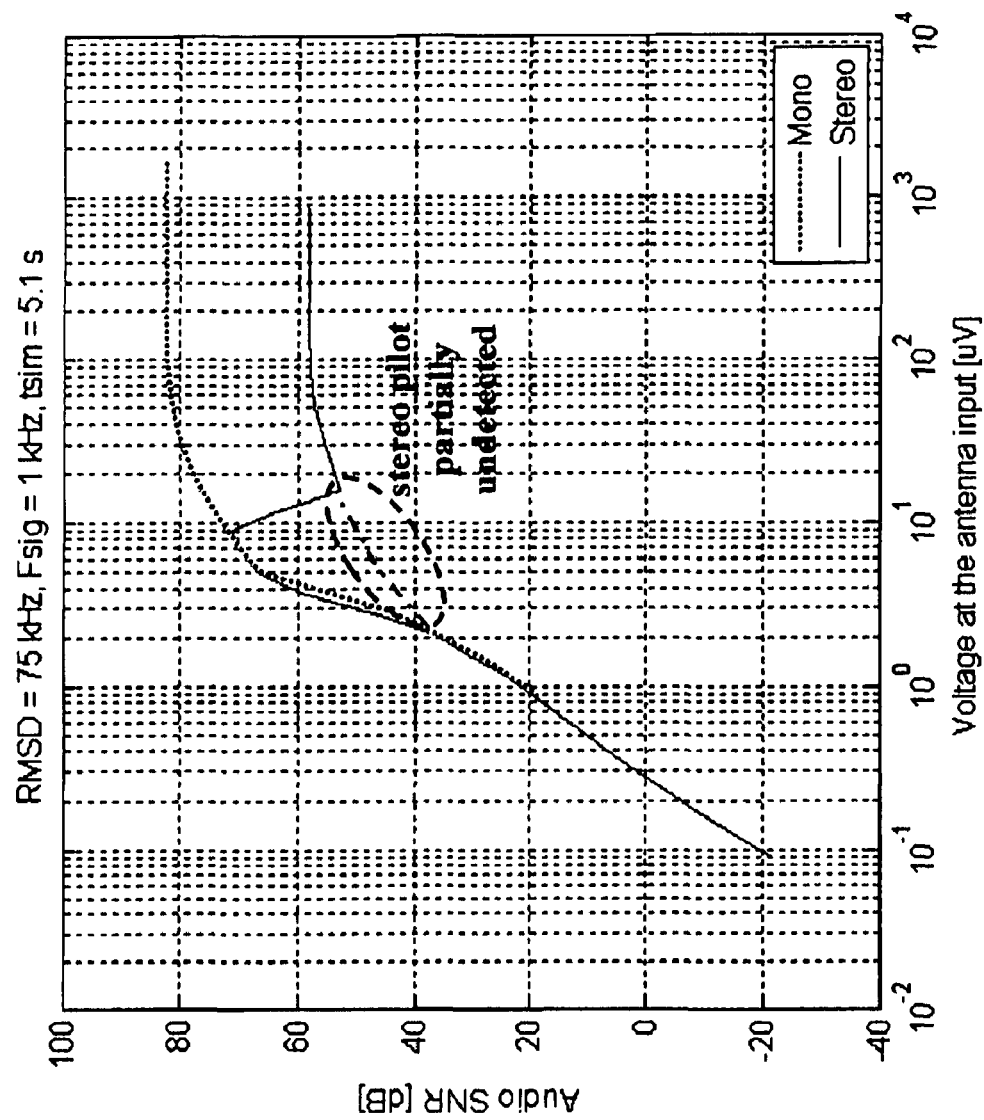
FIG. 8 shows an exemplary plot of mono/stereo pilot detection scenario against the signal voltage received at the antenna.

FIG. 8 shows a similar plot as that of FIG. 7, but with a modified portion of the stereo curve in the grey area between 2 µV and 11 µV. In a similar manner to that shown in FIG. 7, if the received signal strength is beyond a threshold that corresponds to the received signal strength at the antenna being greater than 11 µV, the stereophonic mode can be easily distinguishable from the monophonic mode. Thus, a decision can be made about the receiver operating mode based on the received pilot signal with a high level of confidence. If the received signal strength is below the threshold, that corresponds to the received signal strength at the antenna being less than 2 µV, the stereophonic mode can be difficult to distinguish from the monophonic mode, and the receiver can remain in a monophonic operating mode. However, in the grey area when the received signal strength lies between 2 µV and 11 µV, in this example, the receiver can be kept operating in monophonic mode until the received signal strength improves enough to be able to make a judicious choice of the receiver operating mode based on the stereo pilot detection.

Figure 9:
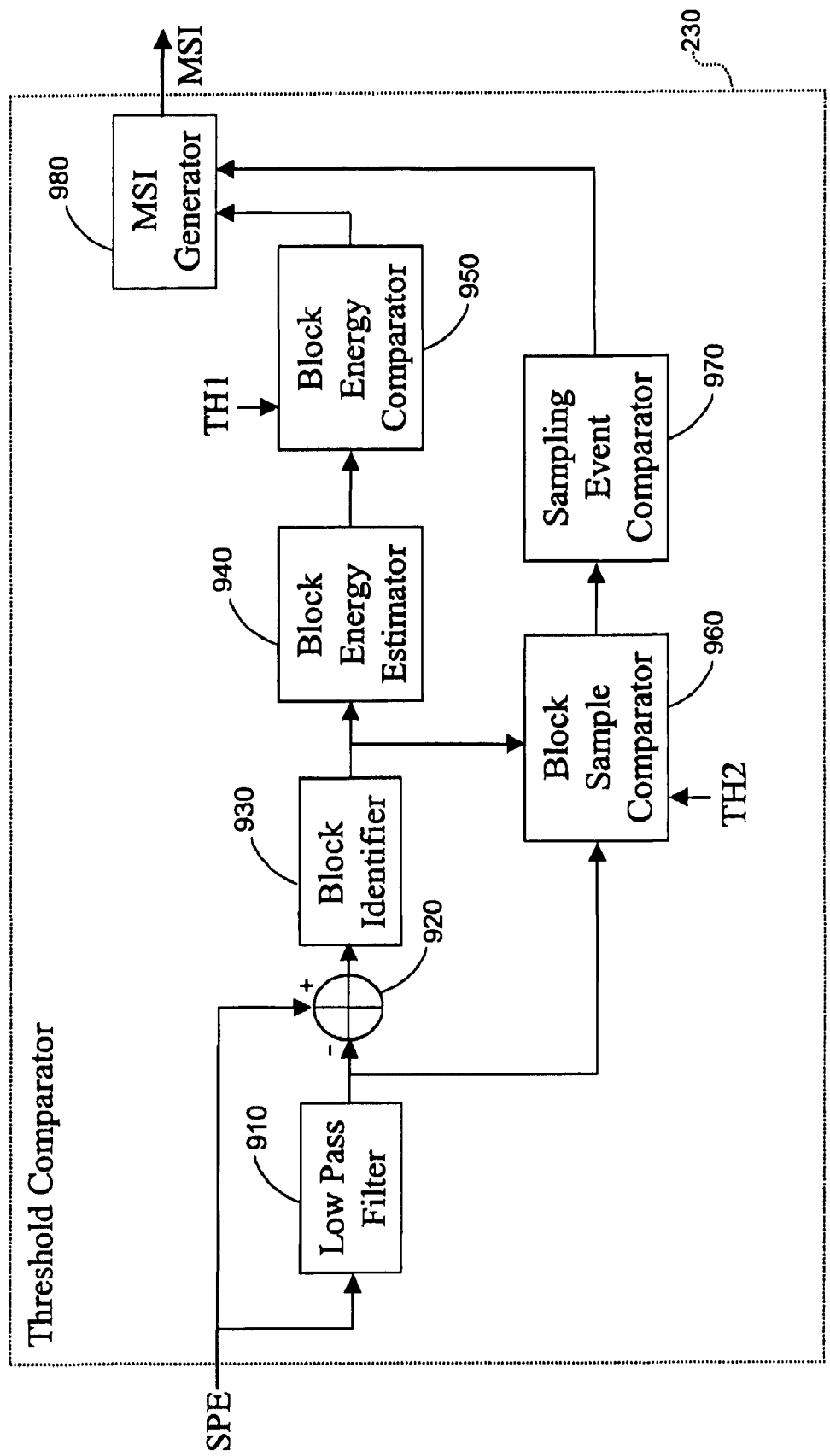
FIG. 9 shows a block diagram of threshold comparator that can be part of the MSD of FIG. 2 that generates the mono/stereo indicator control signal MSI.

FIG. 9 shows a block diagram of threshold comparator 230 that processes sample pilot energy signal SPE to generate the mono/stereo indicator MSI signal. As shown, the threshold comparator 230 can include a low pass filter 910 to reduce the noise/interference in SPE. Subsequently, a subtractor 920 can subtract the low pass filtered version of the SPE from itself to generate a difference signal that is referred to as a residual signal. A block identifier 930 identifies an observation interval that can include a pre-defined set of samples that are from the output of the low pass filtered SPE signal. Also included may be a block energy estimator 940, that calculates the energy of the residual signal over the observation interval, followed by a block energy comparator 950, that compares the aforementioned energy of the residual signal against a predetermined threshold value TH1 and outputs a channel condition signal. A block sample comparator 960 calculates how many times the low pass filtered sample pilot energy signal SPE exceeds a predetermined threshold value TH2 which is referred to as a sample number. Subsequently, the sampling event comparator 970 checks if the sample number available at the output of the block sample comparator 960 exceeds a predetermined threshold and outputs a pilot energy status signal. The MSI generator 980 receives the channel condition signal and the pilot energy status signal, and makes a decision as to whether at any time the receiver should be operating in a monophonic mode or a stereophonic mode. The MSI generator 980 also decides if the receiver operating mode needs to be changed from monophonic to stereophonic or vice versa. The MSI generator 980 outputs an MSI signal representative of the appropriate receiver operating mode.

During operation, pilot signal energy samples SPE are input to the threshold comparator 230 and processed by the low pass filter 910. It should be appreciated that low pass filter 910 can be a 1-tap IIR filters, or any other kind of low pass filters suitable for "smoothing" or reducing the noise level of sample pilot energy signal SPE. The low pass filter used in this simulation can include the following transfer function H(z) where ρ is the leakage factor and z is a delay factor:

$$H(z) = \frac{\rho}{1 - (1-\rho)z^{-1}}$$

As referenced above, characteristics of the filter can be varied over time to achieve a desired trade off between the response and accuracy of the energy estimate.

At the output of the low pass filters 910, sample pilot energy signal SPE is "smoothed" which can result in a better estimate of the pilot energy. The low pass filter 910 can be followed by the subtractor 920 that subtracts the "smoothed out SPE" from the SPE itself. The difference samples that are the output of the subtractor 920 are referred to as the residual signal. The residual signal can be thought of as representing the samples of the composite of the noise and interference in SPE. Subsequently, a determination can be made to see if the channel condition is too noisy by comparing energy of the residual signal over an observation interval with a predetermined residual block energy threshold. Additionally, a determination can be made to see if the pilot tone energy is inadequate. The mode of the receiver can then be switched based on the outcome.

The observation interval can be defined by the block of N samples of the smoothed out pilot energy samples which are the outputs of the low pass filter 910. Each block of N samples, in one embodiment, may be defined in a way that each successive block is contiguous to the previous, as well as the next block, but there is no overlap of samples from one block to the immediately previous or immediately subsequent block. However, it should be understood that there may be other embodiments that may have the blocks to be disjointed or even parts of a block to include samples that are non-contiguous. The task of collecting the samples together to form successive blocks can be done by a block identifier 930.

As described above, the channel condition can be determined to be either good or noisy. This can be accomplished by generating the residual signal as a difference between the pilot energy signal and the filtered pilot energy signal by subtractor 920. Residual block energy can be determined over an observation interval by accumulating the residual energy samples over the observation interval. The residual block energy level can be determined using any technique, such as L1 norm or L2 norm. Subsequently, the residual block energy can be compared to a predetermined residual block energy threshold. If the determined residual block energy is greater than the threshold, then the channel is designated as noisy. Alternatively, if the residual block energy exceeds the threshold, then the channel is designated as good. The energy of the residual signal is estimated over the observation interval by accumulating the residual sample values corresponding to those samples that constitute a block. The accumulation may be performed by the block energy estimator 940 of FIG. 9. Subsequently, the energy estimate over the block is compared to a value Th1 by the block energy comparator 950 of FIG. 9. If the energy estimate is more than Th1 the channel is determined to be noisy.

As also described above, the pilot energy can be determined to be either adequate or inadequate. This can be accomplished by determining whether a sample number of the smoothed out pilot energy samples, obtained after the low pass filter 910, are less than a pilot energy threshold for the block. The received pilot energy is deemed to be inadequate if the sample number exceeds a pilot energy threshold $E_{PT}$. Alternatively, if the sample number does not exceed the pilot energy threshold $E_{PT}$, then the pilot energy is deemed to be adequate. A monitor signal can be generated that is indicative of the number of times the pilot energy signal is less than a pilot energy threshold during the observation interval.

The determination that the received pilot signal is weak enough, for the block under consideration to be deemed as monophonic, can be done by a three step process. First, the smoothed out pilot energy estimate is compared to a value Th2 by the block sample comparator 960 of FIG. 9. The next step is performed by the sampling event comparator 970 that counts the number of times the estimated energy value is less than Th2 over a specific block, referred to as a sample count. The final step is also performed by the sampling event comparator 970 and it checks if the sample count is more than an integer Th3 and, if that is true, it is determined that the received pilot energy signal is not strong enough.

If either of two conditions is satisfied, that of the channel being noisy and the pilot signal energy being inadequate, the concerned block is designated as monophonic. But if none of these two conditions is satisfied, the concerned block is designated as stereophonic. In order to avoid rapid switching between the two receiver modes, switching between modes can be delayed until a predetermined number of consecutive blocks, either mono or stereo, are determined to be the same after a judicious length of observation. Hence, if the receiver is in monophonic mode the MSI generator 980 would only change the receiver's mode to stereophonic, if the number of consecutive blocks identified as stereophonic exceeds the predetermined number. Similarly, if the receiver is in stereophonic mode, the MSI generator 980 would only change the receiver's mode to monophonic if the number of consecutive blocks being monophonic exceeds another or same predetermined number.

The MSI generator 980 keeps track of the status of the blocks to determine whether the receiver should switch modes. Once the MSI generator 980 decides that a mode of the receiver should be switched, the MSI generator 980 can signal the decoder 240 to switch modes via the MSI signal.

For example, if the MSI signal indicates that the energy of the detected pilot tone signal is sufficient and the channel condition indicates that the noise is less than a predetermined noise energy threshold $E_{NT}$, the decoder 240 will output left and right signals L and R in stereophonic form. Whereas, if the MSI signal indicates that the energy of the detected pilot tone signal is either insufficient or the channel condition is too noisy as compared to the predetermined noise energy threshold $E_{NT}$, decoder 240 will output left and right signals L and R in monophonic form. Hence, a robust, reliable and flexible detection of stereophonic signals can be achieved.

Figure 10:
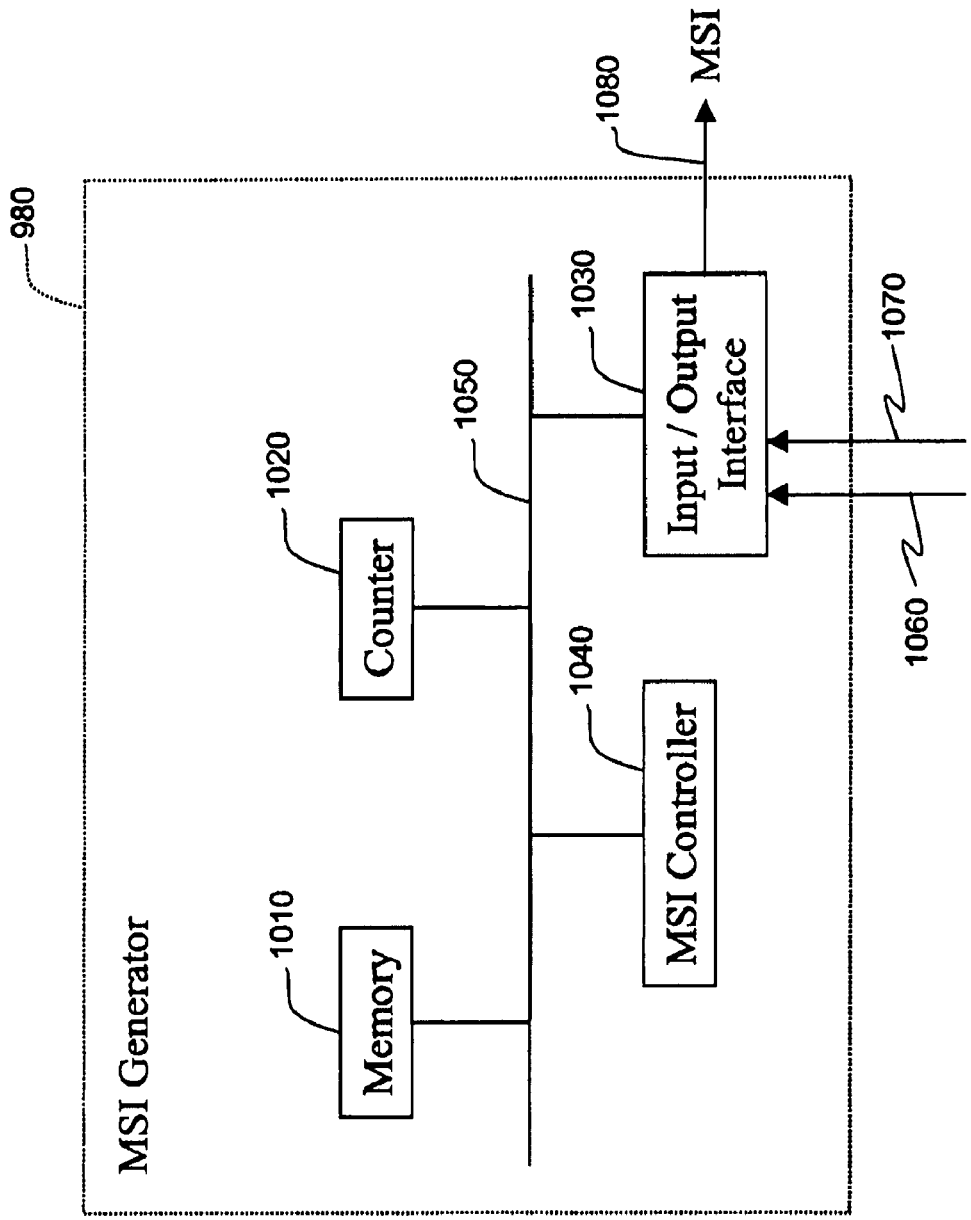
FIG. 10 shows an exemplary block diagram of MSI generator of FIG. 9.

FIG. 10 details the MSI generator 980. As shown, the MSI generator 980 can include a memory 1010, counter 1020, MSI controller 1040 and an input/output interface 1030. As shown in FIG. 10, these components can be coupled together via bus 1050, over which the components can communicate with one another.

During operation, the MSI generator 980 can receive input from the block energy comparator 950 and the sampling event comparator 970 via lines 1060 and 1070, respectively. Once received, the input/output interface 1030 can pass the information to the MSI controller 1040. In conjunction with the memory 1010, the MSI controller 1040 can process the information received from the block energy comparator 950 and sample event comparator 970 of FIG. 9. More specifically, the MSI controller 1040 can identify a block as either a mono block or a stereo block based on the comparison of a residual block energy of the residual signal over an observation interval and a comparison of a sample number of times the filtered pilot energy sample is less than a pilot energy threshold during the same observation interval. Thus, if the signal from block energy comparator 950 indicates that the channel is noisy or if the signal sampling from sampling event comparator 970 indicates that the pilot signal energy is inadequate, the MSI controller 1040 can designate that particular block as a mono block. Alternatively, if neither of the above conditions are satisfied, then the MSI controller 1040 can designate the block as a stereo block.

The number of consecutive blocks, either mono or stereo, can be counted by counter 1020 in order to track a number of consecutive blocks that are either mono or stereo. The count may be stored in memory 1010. In other words, counter 1020 can be incremented each time a block is consecutively determined to be mono or stereo. That count can be later compared against a predetermined number to determine whether a consecutive series of either mono or stereo blocks exceed a predetermined number. If the MSI controller 1040 detects that a consecutive number of mono or stereo blocks exceeds that number, then the MSI controller 1040 can send a signal to input/output interface 1030 to transmit an MSI signal on line 1080 to the decoder 240. The MSI signal can cause decoder 240 to operate in either monophonic or stereophonic mode.

Figure 11:
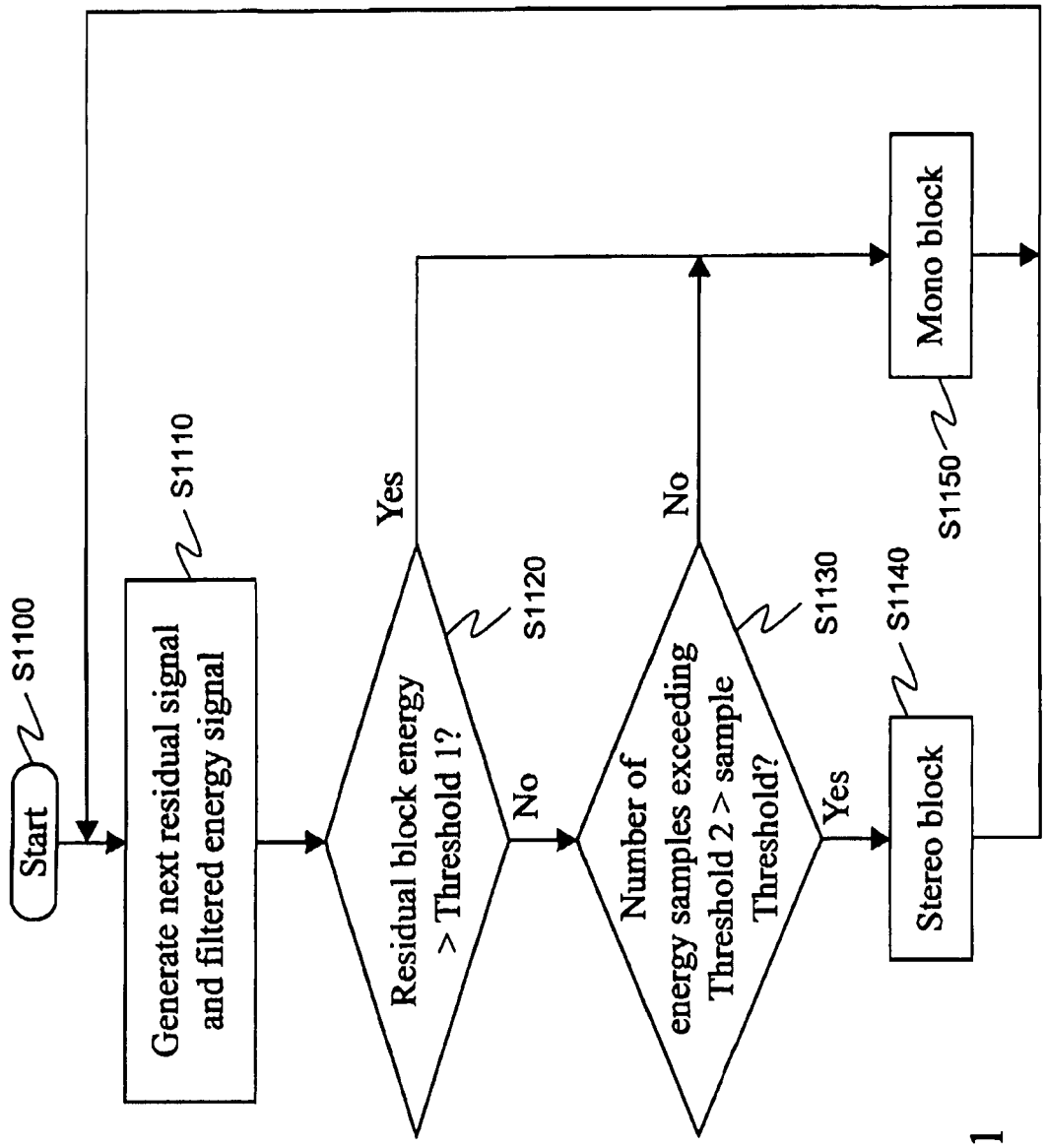
FIG. 11 shows an exemplary flowchart of an exemplary MSD process for detecting a monophonic/stereophonic signal block using a channel condition estimate and the pilot signal energy estimate over the observation interval.

FIG. 11 is a flowchart showing an exemplary process of determining whether a block should be identified as either a stereo block or a mono block. The process begins at step S1100, and proceeds to step S1110.

In step S1110 a residual signal and a filtered pilot energy signal are generated. For example, the filtered pilot energy signal can be created by passing the SPE through a low pass filter, and the residual signal can be generated as the difference between the unfiltered and filtered pilot energy signal. The process then proceeds to step S1120.

In step S1120, a determination is made as to whether the residual block energy is greater than a first threshold. If the residual block energy is greater than the first threshold Threshold 1, then the process proceeds to step S1150; otherwise, the process proceeds to step S1130.

In step S1150, because the residual block energy is greater than the first threshold, the channel is determined to be too noisy, and therefore the block is identified as a mono block. The process then returns to step S1110 to repeat.

Alternatively, if the process proceeds to step S1130, the process determines how many of the energy samples exceed a second threshold, Threshold 2. The number of energy samples exceeding the second threshold is subsequently compared to a predetermined sample threshold. If the number of energy samples exceeding the second threshold is less than the predetermined sample threshold, then the process proceeds to step S1150 similar to the above; otherwise, the process proceeds to step S1140.

In a manner similar to that above, if the process proceeds to step S1150, the pilot energy signal has been determined to be too weak, and therefore the block is identified as a mono block. After designating the block as a mono block, the process then returns to step S1110 and repeats.

In step S1140, the block is designated a stereo block, and the process then returns to step S1110 and repeats.

Figure 12:
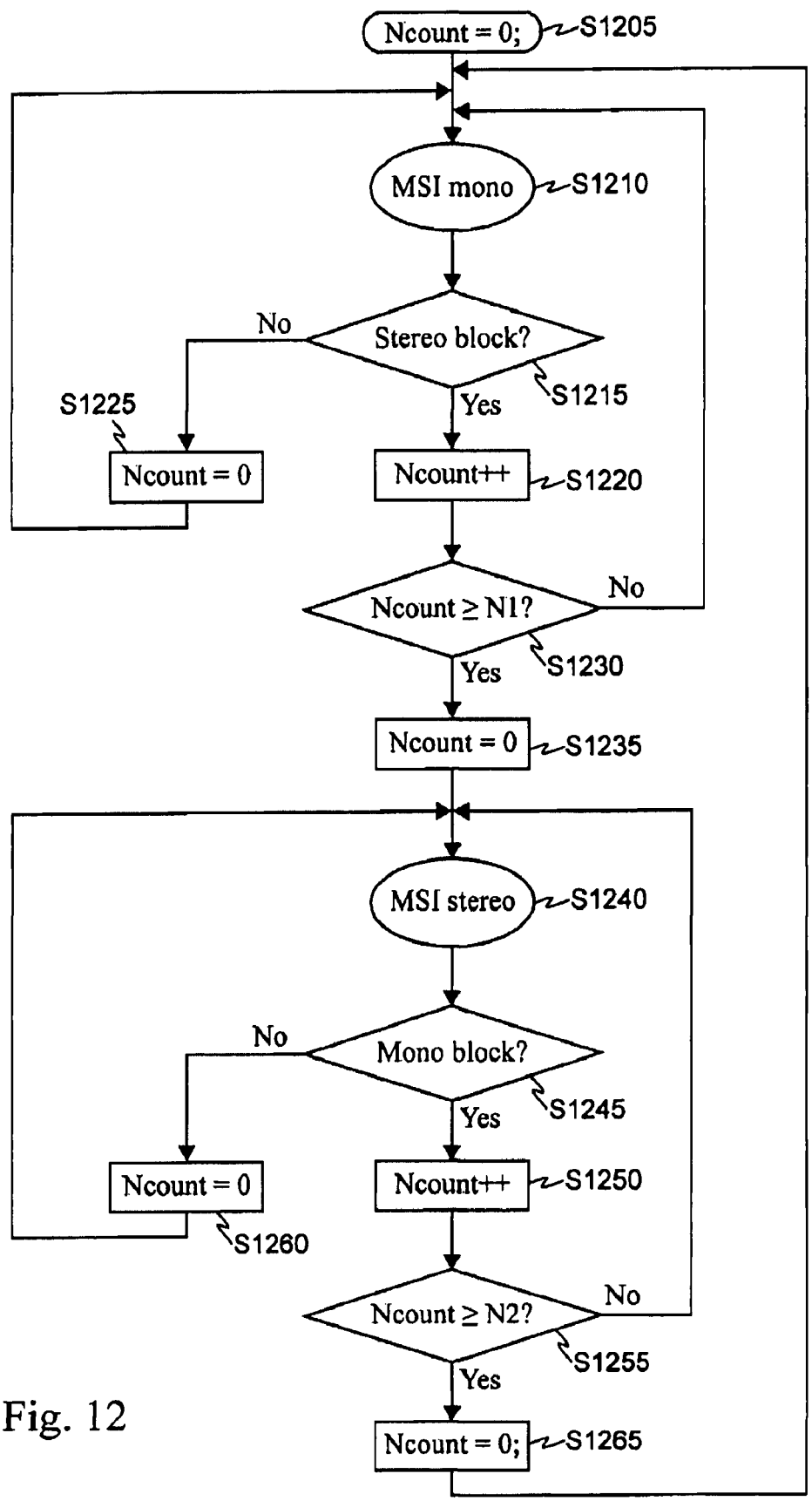
FIG. 12 shows an exemplary flowchart of an exemplary MSI detection process for a monophonic/stereophonic mode selection of the receiver.

FIG. 12 shows an exemplary process for determining an MSI signal, and therefore controlling a mode of operation of the receiver. The process begins in step S1205 and proceeds to step S1210, where the MSI signal can initially be set to mono. The process then proceeds to step S1215.

In step S1215, the process determines whether a block has been identified as a stereo block. If the block is designated as a stereo block, the process proceeds to step S1220; otherwise, if the block is not identified as a stereo block, the process proceeds to step S1225.

In step S1225, the count Ncount is reset to a 0 value. The process then returns to step S1210 to repeat.

In step S1220, the count Ncount is incremented by one. The process then proceeds to step S1230.

In step S1230, the process determines whether the count Ncount is greater than or equal to a first count threshold N1. If the count Ncount is greater than the count threshold N1, then the process proceeds to step S1235; otherwise the process returns to step S1210 and repeats while the receiver remains operating in monophonic mode.

In step S1235, the count Ncount is reset to 0. The process then proceeds to step S1240.

In step S1240, the MSI signal is set to stereo, and therefore the receiver operates in the stereophonic mode, as described above. The process then proceeds to step S1245.

In step S1245, the determination is made as to whether a received block is a mono block. If the block is determined to be a mono block, the process then proceeds to step S1250; otherwise, the process proceeds to step S1260.

In step S1260, the count Ncount is reset to 0. The process then returns to step S1240 and repeats while the receiver remains in stereophonic mode.

In step S1250, the count Ncount is incremented by one. The process then proceeds to step S1255. In step S1255, the determination is made as to whether the count Ncount is greater or equal to a second predetermined threshold N2. If the count Ncount is determined to be greater than or equal to the second threshold N2, then the process proceeds to step S1265; otherwise, the process returns to step S1240 and repeats.

In step S1265, the count is reset to 0. Afterwards, the process returns to step S1210 and repeats.

It should be understood that the pilot energy thresholds $E_{PT}$ and noise energy threshold $E_{NT}$, as well as other thresholds, may be either fixed or variable. Depending on design parameters, operating conditions, or the mere preference of a user, $E_{PT}$ and $E_{NT}$ may be either manually or automatically adjusted to maximize the performance of the receiver system incorporating the mono/stereo detector. For example, if need be, the user can raise the noise energy threshold $E_{NT}$ to enjoy a stereophonic sound at the expense of an increase in noise.

Furthermore, it should be appreciated that mono/stereo detector MSD can detect pilot energy signals of stereophonic broadcasts at 50 kHz, 75 kHz and other rated maximum system deviation RMSD.

For purposes of explanation, in the above description, numerous specific details are set forth in order to provide a thorough understanding of the receiver. It will be apparent, however, to one skilled in the art that receiver can be practiced without these specific details. In other instances, well-known structures and devices are shown in block diagram form in order to avoid obscuring the receiver.

While aspects of the invention have been described in conjunction with the specific embodiments thereof, it is evident that many alternatives, modifications, and variations will be apparent to those skilled in the art. Accordingly, embodiments of the invention as set forth herein are intended to be illustrative, not limiting. There are changes that may be made without departing from the spirit and scope of the invention.

What is claimed is:

1. A method for switching a mode of a receiver, the method comprising:
   generating a residual signal indicative of a noise level associated with a pilot energy signal;
   calculating a residual block energy level of the residual signal over an observation interval;
   generating a monitor signal based on a number of times the pilot energy signal is less than a pilot energy threshold during the observation interval;
   switching the mode of the receiver based on the residual block energy level and the monitor; and
   designating a portion of the residual signal within the observation interval as either a mono block or a stereo block based on the residual block energy level and the monitor signal.

2. The method according to claim 1, further comprising:
   designating the portion as a mono block when the residual block energy level over the observation interval is greater than a residual block energy threshold, or the monitor signal is less than a mode switch threshold; and otherwise, designating the portion as a stereo block.

3. The method according to claim 1, further comprising:
   switching the mode of the receiver from a monophonic mode to a stereophonic mode if a predetermined number of consecutive portions of the residual signal are designated as stereo blocks.

4. The method according to claim 1, further comprising:
   switching the mode of the receiver from a stereophonic mode to a monophonic mode if a predetermined number of consecutive portions of the residual signal are designated as mono blocks.

5. The method according to claim 1, wherein the monitor signal is generated by incrementing a counter every time the pilot energy signal is less than the pilot energy threshold during the observation interval.

6. The method according to claim 1, wherein the residual signal is based on a difference between a pilot energy signal and a filtered pilot energy signal.

7. The method according to claim 6, further comprising:
   filtering the pilot energy signal to generate the filtered pilot energy signal by using a filter having a response transfer function H(z):

$$H(z) = \frac{\rho}{1 - (1 - \rho)z^{-1}}$$

where ρ is a leakage factor and z is a delay factor.

8. The method according to claim 7, further comprising:
   varying the leakage factor between a first value and a second value to minimize a noise level of the filtered pilot energy signal and to reduce a response time of the receiver, wherein the first value is greater than the second value.

9. A receiver comprising:
   an extractor that extracts a pilot energy signal from an input signal; and
   a threshold comparator that generates a residual signal indicative of a noise level associated with a pilot energy signal, calculates a residual block energy level of the residual signal over an observation interval, generates a monitor signal based on a number of times the pilot energy signal is less than a pilot energy threshold during the observation interval, designates a portion of the residual signal within the observation interval as either a mono block or a stereo block based on the residual block energy level and the monitor signal, and generates a mono/stereo indicator (MSI) signal indicative of a mode of the receiver that is based on the residual block energy level and the monitor signal.

10. The receiver of claim 9, further comprising:
    a decoder that causes the receiver to output either a monophonic or a stereophonic signal based the MSI signal received from the threshold comparator.

11. The receiver claim 9, wherein the threshold comparator designates the portion as a mono block when the residual block energy level over the observation interval is greater than a residual block energy threshold, or the monitor signal is less than a mode switch threshold; and otherwise, the threshold comparator designates the portion as a stereo block.

12. The receiver of claim 11, wherein the threshold comparator switches from generating an MSI signal indicative of a monophonic mode and to generating an MSI signal indicative of a stereophonic mode if a predetermined number of consecutive portions of the residual signal are designated as stereo blocks.

13. The receiver of claim 11, wherein the threshold comparator switches from generating an MSI signal indicative of a stereophonic mode and to generating an MSI signal indicative of a monophonic mode if a predetermined number of consecutive portions of the residual signal are designated as mono blocks.

14. The receiver of claim 9, wherein the residual signal is based on a difference between a pilot energy signal and a filtered pilot energy signal.

15. The receiver of claim 14, wherein a filter that filters the pilot energy signal to generate the filtered pilot energy signal has a response transfer function H(z):

$$H(z) = \frac{\rho}{1-(1-\rho)z^{-1}}$$

where ρ is a leakage factor and z is a delay factor.

16. The receiver of claim 15, wherein the filter varies the leakage factor between a first value and a second value to minimize a noise level of the filtered pilot energy signal and to reduce a response time of the receiver, wherein the first value is greater than the second value.

17. The receiver of claim 9, wherein the threshold comparator further comprising:
a block identifier that defines the observation interval of the residual signal and the pilot energy signal.

18. The receiver of claim 17, the threshold comparator further comprising:
a block energy estimator that calculates the residual block energy level over the observation interval; and
a block energy comparator that determines whether the residual block energy level for the observation interval is greater than a residual block energy threshold and outputs a channel condition signal.

19. The receiver of claim 18, the threshold comparator further comprising:
a block sample comparator that generates the monitor signal based on the number of times the pilot energy signal is less than the pilot energy threshold during the observation interval; and
a sampling event comparator that determines whether the monitor signal exceeds a mode switch threshold and outputs an indicative pilot energy status signal.

20. The receiver of claim 19, the threshold comparator further comprising:
an MSI generator that generates an MSI signal indicative of the mode of the receiver based on the channel condition signal and pilot energy status signal.

21. The receiver of claim 20, the MSI generator further comprising:
a controller that designates a portion of the residual signal within the observation interval as a mono block when the residual block energy level for the observation interval is greater than the residual block energy threshold, or when the monitor signal is less than the mode switch threshold; and otherwise, the controller designates the portion as a stereo block.

22. The receiver of claim 21, wherein the controller further generates an MSI signal indicative of a switch from a monophonic mode to a stereophonic mode, if a predetermined number of consecutive portions of the residual signal are designated as stereo blocks.

23. The receiver of claim 21, wherein the controller further generates an MSI signal indicative of a switch from a stereophonic mode to a monophonic mode, if a predetermined number of consecutive portions are designated as mono blocks.

* * * * *